March 25, 1952     K. H. H. SCHUMANN     2,590,469
INSTRUCTIONAL DEVICE
Filed Sept. 21, 1950     2 SHEETS—SHEET 1
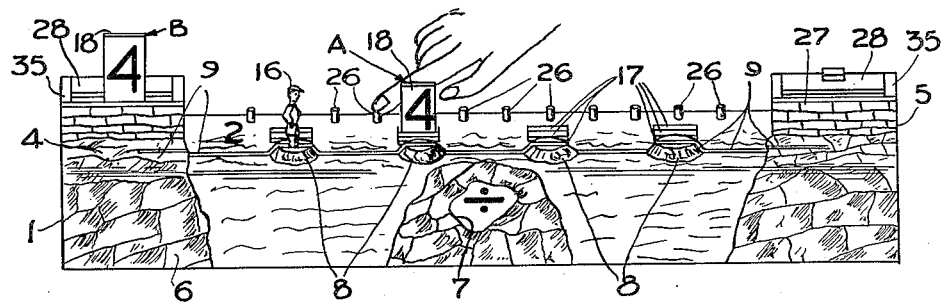
Fig. 1.
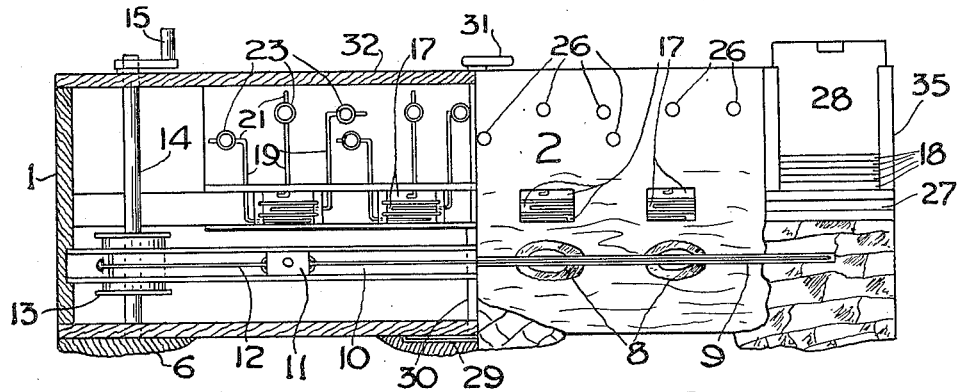
Fig. 2.
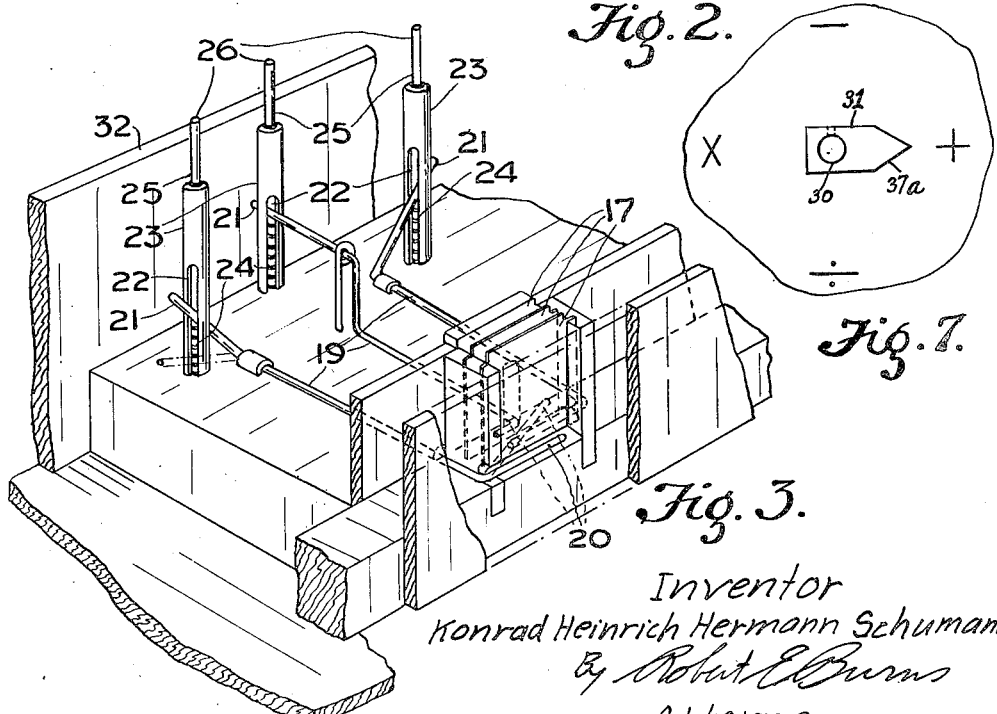
Fig. 3.
Fig. 7.
Inventor
Konrad Heinrich Hermann Schumann
By Robert E. Burns
Attorney March 25, 1952　　K. H. H. SCHUMANN　　2,590,469
INSTRUCTIONAL DEVICE
Filed Sept. 21, 1950　　　　　　　　　　　2 SHEETS—SHEET 2
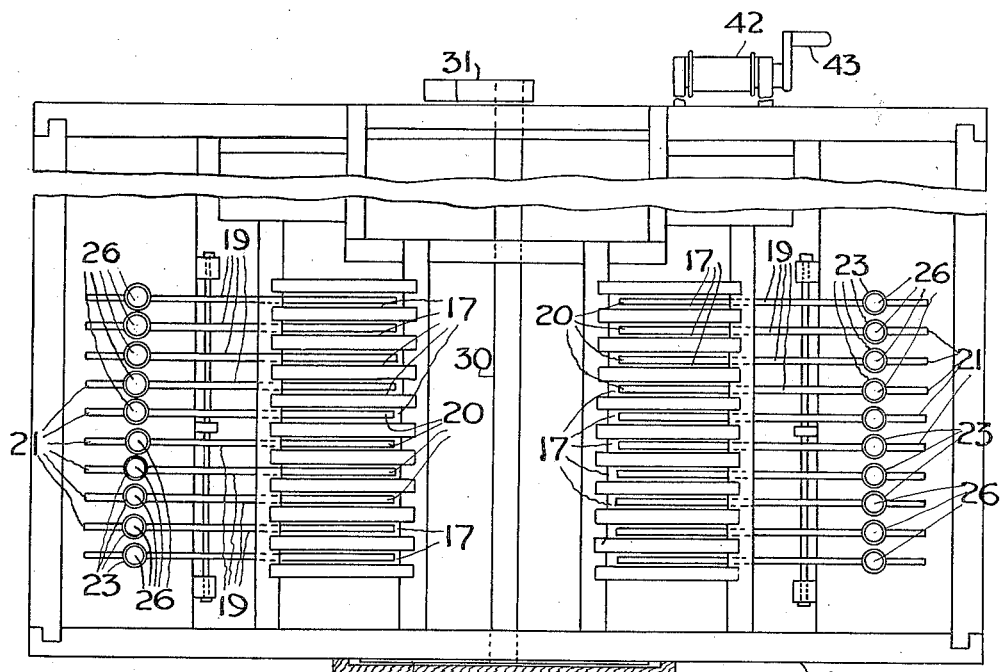
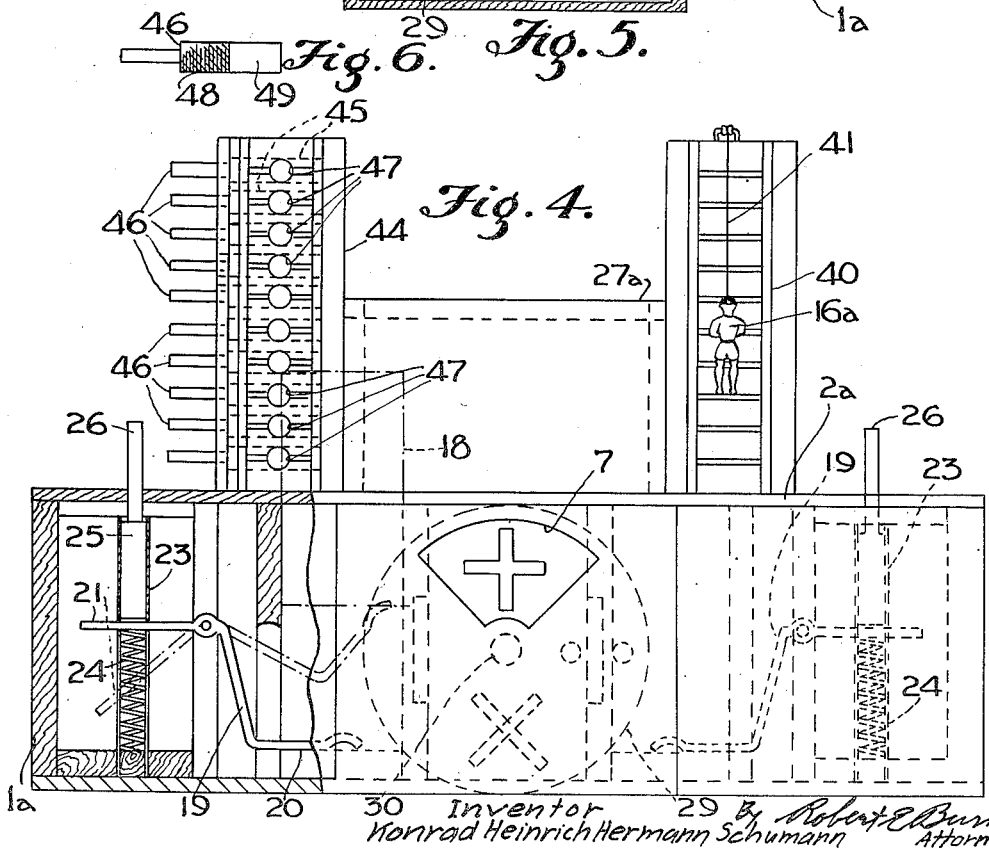
Inventor
Konrad Heinrich Hermann Schumann
By Robert E. Burns
Attorney Patented Mar. 25, 1952

2,590,469

UNITED STATES PATENT OFFICE 2,590,469

INSTRUCTIONAL DEVICE

Konrad Heinrich Hermann Schumann, Lyttelton, Pretoria, Transvaal, Union of South Africa Application September 21, 1950, Serial No. 185,937
In the Union of South Africa July 5, 1949

4 Claims. (Cl. 35—31)

This invention relates to instructional devices and provides a device for facilitating the teaching of arithmetic insofar as the four rules, addition, subtraction, multiplication and division of simple numbers, are concerned. The invention further provides for the instruction being given in a way having a marked appeal to the young pupil on account of the interesting manner in which successes in answering the questions set to him are announced or indicated.

According to the invention a device of the foregoing kind comprises means for exposing a basic number and in succession any one or more other numbers to be combined arithmetically therewith, and a sign showing the arithmetical process to be applied, there being provided also a small figure of interest to the pupil, as of a boy or girl, movable from a starting position in stages to a final position as each of a series of question is correctly answered. The stages may be represented in various ways to hold the interest of the pupil and encourage him, as, for instance, in the form of a series of "stepping stones" across a representation of a river from one bank thereof to the other, the figure being advanced by the teacher from the bank to the first stone and so on to the opposite bank as and if each and all of the series of questions posed to the pupil by changing the displayed numbers is or are correctly answered.

In a practical form, the device may consist of a rectangular box, which may be set on the teacher's desk, with its upper surface modelled to show a section of a river with banks at the sides, preferably in solid contour or relief and suitably coloured.

Along the back of the box, rows of push buttons are provided, any of which the teacher may be depressing so as, through suitable mechanism inside the box, to move up into vision any one or more of a number of cards or the like bearing numbers and conveniently arranged to be concealed in packs contained in a row of recesses in the top of the box spaced more or less evenly across the "river." Nearer the front of the box, the "banks" are provided with slot-like recesses in either of which a loose card or cards, also marked with a number or numbers, may be set in view of the class, whilst a line joining the said recesses any number of spaced "stepping stones" are modelled on the "river," preferably respectively in front of the card-pack recesses.

Still nearer to the front, between a further pair of slot-like recesses in the opposite "banks" there is provided a flexible band or the like with means for winding it in either direction across the surface of the "river."

The band or like means carries a card or cutout figure, as of a child looking in a direction across the "river," and by winding the figure can be set into one of the recesses of the "banks" or moved into line with any of the "stepping stones," and eventually into the opposite "bank" recess.

The arithmetical process to be performed by the pupil is denoted by changeable or adjustable means to which the "+," "—," "×," "÷" signs are applied and of which any one is capable of being displayed at the front wall of the box to indicate whether addition, subtraction, multiplication or division is required. Ordinarily, each question is posed from a basic number shown to the class by the card or cards erected by the teacher in one of the "bank" recesses in line with the "stepping stones," with the moving figure located in the recess in front of the basic number, whereupon an appropriate button is depressed by the teacher to raise a numbered card out of the pack nearest to that "bank." The "process" sign may require addition then of the number shown upon the raised card to the basic number. If the pupil answers correctly the button is released allowing the raised card to drop back into its pack and the figure is then advanced to the first "stone." This process is repeated by depressing selected buttons in turn to raise a card of the next pack ahead of the figure, with or without change of the basic number and/or the "process" card from time to time as the figure advances, eventually to reach the opposite "bank."

In a modification, the figure may be moved in stages represented conveniently by the rungs of a ladder erected on the box in place of the representation of a river as above. In this case the figure may be raised in stages, i. e. rung by rung, by simple cable or cord or by a band working in a vertical sense, with winding means equivalent to those already described. The "ladder" may be mounted, or depicted in erected position on the front of a board or screen, which may provide a holder for the basic number card or cards and in front of which the line of card pack recesses may be arranged for exposure under control of the push-buttons or some equivalent system.

In order that the present invention may be more clearly understood and carried into practice, reference is now made to the accompanying sheets of drawings in which like reference numerals refer to like parts throughout the several views.

In the drawings:

Figure 1 is a front elevation of an instructional device for the purpose set forth and constructed according to the present invention;

Figure 2 is a half plan and a half horizontal section of the device shown in Figure 1;

Figure 3 is a fragmentary isometric view of the press-button and card elevating or raising mechanism;

Figure 4 is a sectional front elevation of a modified form of instruction device for the purpose set forth and constructed according to the present invention;

Figure 5 is a plan view of Figure 1 with the top cover and mountings removed; and Figure 6 is an elevation of a part used in the device shown in Figures 4 and 5.

Figure 7 is a fragmentary rear view of the device shown in Figures 4 and 5.

In the drawings, reference numeral 1 denotes the box structure of which the top 2 is modelled in solid contour or relief and coloured to show a river with banks 4 and 5 at the sides. The front 6 is modelled and coloured to show a waterfall and a cave or grotto 7. The top 2 is preferably tilted forwardly for easy view of the class.

Adjacent the front edge of the top 2 a number of spaced upwardly projecting members 8 are provided which represent "stepping stones." A longitudinal slot 9 is provided in the top 2 which extends through the "stepping stones" 8 and into the banks 4 and 5. A slotted or grooved member 10 is mounted internally of the box structure 1, below the slot 9, to form a guide or rail for a block 11 which is connected to an endless band, string or the like 12 which has a part of its lower rung wound around a small drum 13 whereby the block 11 is arranged to be drawn along the guide or rail 10 in either longitudinal direction. Said drum 13 is mounted on a shaft 14 of which one end, which extends out of the back of the box structure 1, is provided with a crank handle 15 for rotation of the drum 13. If desired, two drums may be provided having separate crank handles and onto which drums the ends of the two bands or strings or the like of the block 11 are wound so that a separate crank handle causes movement to the block 11 to the left and to the right.

On the block 11 an upwardly projecting figure 16, in the form of a boy or girl, is mounted which projects through the slot 9. Said figure 16 is preferably reversible and carries the picture of a boy on the one side and that of a girl on the other side. On turning the crank handle 15, the figure 16 is capable of being drawn from banks 4 or 5 in stages to the "stepping stones" 8 to the opposite "bank" 5 or 4, as the case may be.

In the top 2, and in the vicinity of each "stepping stone" 8, a number of vertical compartments 17 are provided in each of which a card or like flat element 18 is loosely and readily removably housed. Said cards or elements 18, of which any number may be provided, are each provided with a numeral on one or both faces. Preferably a large numeral is painted on one face and a similar small numeral at the top of the reverse face so that the teacher, at the back of the device, may know the value of the numeral while still concealed from the class.

A plurality of levers 19 are pivotally mounted inside the box structure 1. Each one of said levers 19 has one of its ends 20 arranged within a compartment 17 so that on depression of the opposite end 21, the end 20 raises the card 18 to a position where its figure is clearly displayed to the class. The ends 21 of levers 19 are each located in longitudinal slots 22 provided in vertically disposed tubular elements 23, while compression springs 24, located in said tubular elements 23 below the lever ends 21, normally retain the ends 20 of the levers in the down or retracted position. In the upper parts of the tubular elements 23 plunger-like members 25 are slidably housed and extend outwardly of the top ends of said elements 23 and through holes provided in the top 2 of the box structure 1. The upper ends 26 of the plunger elements 25 are in fact push-buttons which, when depressed by the teacher, cause such card 18 to be raised to the display positions as at A in Figure 1.

On the "banks" 4 and 5 recesses or like mounting means 27 are provided in which one or more cards or like flat elements 18 may be fixedly mounted. The mounting means 27 is preferably associated with a container structure 35 which is adapted to resemble a brick or other stone construction. Such container-like structure 35 is adapted to form storage space for the cards or flat elements 18 and is preferably provided with a slidable lid member 28.

The cave or grotto 7 is in fact a window for displaying a section of a vertically disposed rotatable disc 29. The face of the disc 29 is divided into four equal spaces in which the addition sign (+), the minus sign (—), the multiplication sign (×) and the division sign (÷) are applied and which are each displayable through the window 7 when in a corresponding position. The disc 29 is mounted co-axially on the end of a horizontal shaft 30 which extends right through the box structure 1 and provided on the rear end with a crank arm 31 having a pointer 31a which, when turned to any one of the aforesaid arithmetical signs, also marked on the rear wall 32 of the box structure 1 (Fig. 7), will bring the corresponding signs on the disc 29 in a position to correspond with the window 7 in order to be displayed to the class.

In operation the teacher mounts a card 18 of selected numerical value in the mounting 27 on one of the "banks" 4 or 5 as at B and thereafter turns the crank arm 31 to the required position for exposing any one of the arithmetical signs, say the division sign (÷), through the window 7. Thereupon one of the press-buttons 26 is depressed to raise a card 18 from a recess 17 which is thus displayed to the class as at A. The said value of the numeral thus raised, which was selected by the teacher and which has to be divided into the basic number 18 at B, may be caused to be retracted immediately after the correct or any answer is given by releasing the respective press-button 26. If the pupil provides the correct answer the figure 16 is advanced to the first "stepping stone" 8 by the teacher who turns the crank handle 15. When the pupil gives a wrong answer the figure 16 may be wound in the opposite direction towards the starting "bank." Similarly the process may be applied on displaying a different arithmetical process sign such as for additions, subtractions or multiplications.

In a modified construction a step ladder-like structure 40 may be mounted on the top 2a of the box structure 1a and with which structure 40 a figure 16a is associated and arranged to advance in an upward direction from rung to rung. The figure 16a is connected to a string 41 which in turn is connected to a small winding drum 42 or the like which is provided with a crank handle 43 for rotation of the drum 42 and whereby the figure 16a may be raised or lowered along the rungs of the "step ladder" structure 40.

A second ladder-like structure 44 is also mounted on the top 2a of the box structure 1 and in which a number of holes 45 are provided for receiving retractable dowel-like members 46 therein. Said holes 45 are provided with transverse holes 47 directed towards the front so that a portion of the said dowel-like members 46 may be visible therethrough. The dowel-like members 46 have their two half parts 48 and 49 distinctly differently coloured, e. g. red and white or green so that when a question is incorrectly answered, such a member 43 is depressed deeper into its locating hole 45 to show the red colour through the co-acting transverse hole 47 in order to indicate the mistake.

The basic numeral mounting 27a may be disposed at any convenient position, such as between the "step ladders" 40 and 44. Two rows of compartments 17 are provided in which the concealed cards are located. Such compartments are arranged in front of the "step ladders" 40 and 44.

In the said modified construction, the disc 29 carrying the arithmetical process signs is also associated with the front of the box structure 1a and is also mounted on a shaft 30 provided with a crank handle 31 on the rear end for causing rotation of the disc 29.

In either of the forms described, but more simply provided for in the "ladder" form of the device, two or more figures may be independently movable in stages, for purposes of affording competition between two or more pupils of comparable ability who are set the same series of questions and, for instance, allowed equal times for answering them.

To this end two or more "ladders" may be erected or representations thereof provided with a separate figure movable up each of them, separate winding controls being provided.

What I claim is:

1. An instructional apparatus comprising in combination a support member, means on said support member for containing in concealment a plurality of cards bearing a series of numbers for inclusion in an arithmetical process, means for selectively moving said cards into view from said containing means, means bearing the four arithmetic process symbols representing addition, subtraction, multiplication, and division, means providing an aperture in the support member, and means for moving said symbol bearing means relative to said aperture for selectively displaying one of said symbols, said apparatus further comprising support means on said support member for presenting to view a card bearing a basic number to be subjected to the process indicated by the symbol presented to view through the aperture in the support member and the number borne by the card presented to view by said card moving means from said card containing means, and said apparatus further comprising means visibly representing progress stages in linear arrangement, a figure movable with respect to said progress stage representing means to represent a predetermined progress stage, and means for moving said figure.

2. An instructional apparatus as defined in claim 1 wherein said means bearing the arithmetical process symbols comprising a disc divided into four quadrants, each quadrant bearing one of said symbols, said disc being rotatably mounted in said support member, and said disc being fixedly mounted upon a shaft extending traversely through the support member, a crank handle mounted on said shaft, said handle having a pointer disposed relative to markings on said support member for indicating the arithmetic symbol on said disc exposed through the aperture in the support member for each predetermined position of said handle.

3. An instructional apparatus comprising in combination a rectangular box-like support member, means on said support member for containing in concealment a plurality of cards bearing a series of numbers for inclusion in an arithmetical process, means operable exteriorly of said support member for selectively moving said cards into view from said containing means, means bearing the four arithmetic process symbols representing addition, subtraction, multiplication and division, means providing an aperture in the support member, and means for moving said symbol bearing means relative to said aperture for selectively displaying one of said symbols, said apparatus further comprising support means on said support member for presenting to view a card bearing a basic number to be subjected to the process indicated by the symbol presented to view through the aperture in the support member and the number borne by the card presented to view by said card moving means from said card containing means, and said apparatus further comprising means visibly representing progress stages in linear arrangement, said means comprising spaced, vertically-extending members, a figure movable with respect to said progress stage representing means to represent a predetermined progress stage, and means for moving said figure.

4. An instructional apparatus comprising in combination a rectangular box-like support member, means on said support member for containing in concealment a plurality of cards bearing a series of numbers for inclusion in an arithmetical process, means operable exteriorly of said support member for selectively moving said cards into view from said containing means, means bearing the four arithmetic process symbols representing addition, subtraction, multiplication and division, means providing an aperture in the support member, and means for moving said symbol bearing means relative to said aperture for selectively displaying one of said symbols, said apparatus further comprising support means on said support member for presenting to view a card bearing a basic number to be subjected to the process indicated by the symbol presented to view through the aperture in the support member and the number borne by the card presented to view by said card moving means from said card containing means, and said apparatus further comprising means visibly representing progress stages in linear arrangement, said means comprising spaced vertically-extending members, a figure movable with respect to said progress stage representing means to represent a predetermined progress stage, a band extending parallel to said progress stage representing means, said figure being fixedly mounted upon said band, a drum about which said band may be wound, and means exteriorly of said support member for rotating said drum.

KONRAD HEINRICH
HERMANN SCHUMANN.

REFERENCES CITED

The following references are of record in the file of this patent:

UNITED STATES PATENTS

| Number | Name | Date |
| --- | --- | --- |
| 196,583 | Kavanaugh | Oct. 30, 1877 |
| 792,801 | Steele | June 20, 1905 |
| 816,204 | Zahn | Mar. 27, 1906 |
| 1,350,338 | Richards | Aug. 24, 1920 |
| 1,385,623 | Kellogg | July 26, 1921 |
| 1,490,858 | Seegers | Apr. 15, 1924 |
| 1,699,289 | Gleason | June 15, 1929 |
| 1,728,584 | Wright | Sept. 17, 1929 |
| 2,349,066 | Witter | May 16, 1944 |